C. GREENE.
STEERING REACH ROD.
APPLICATION FILED JAN. 25, 1917.
1,272,033.
Patented July 9, 1918.
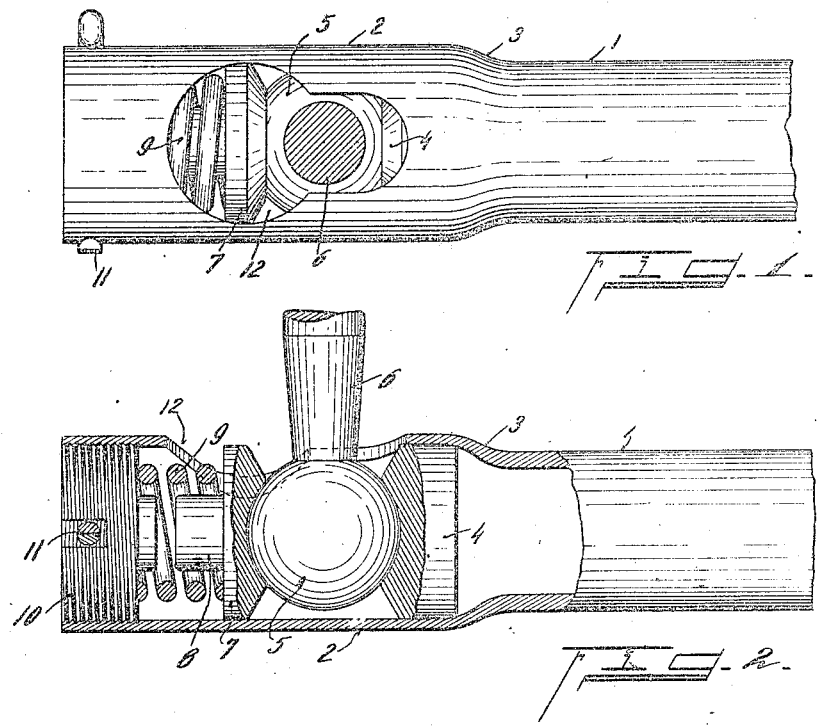
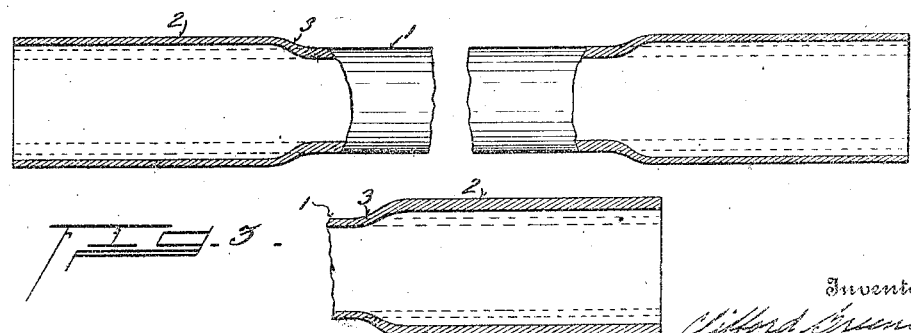

UNITED STATES PATENT OFFICE.

CLIFFORD GREENE, OF CINCINNATI, OHIO, ASSIGNOR TO THE CINCINNATI BALL CRANK COMPANY, OF OAKLEY, CINCINNATI, OHIO, A CORPORATION OF OHIO.

STEERING REACH-ROD.

1,272,033.

Specification of Letters Patent.

Patented July 9, 1918.

Application filed January 25, 1917. Serial No. 144,327.

*To all whom it may concern:*

Be it known that I, CLIFFORD GREENE, a citizen of the United States, and residing at Cincinnati, in the county of Hamilton and State of Ohio, have invented a new and useful Improvement in Steering Reach-Rods, of which the following specification is a full disclosure.

My invention relates to steering reach rods or drag links and particularly to forming the rod from a continuous length of tubing with one or both of its ends swaged or expanded to enlarge its diameter and provide a socket and seat for a ball and crank arm.

It has been customary to form the links of different sized tubing welded or otherwise secured to form the large diameter socket and a seat at the ends of the link.

Such forms of manufacture are unduly expensive and weaken the device at the connecting joints, requiring special inspection. Welded joints in some instances are made so that they can be inspected from the exterior.

An object of the invention is to make the link form a continuous or integral length of tubing by swaging or expanding its ends to enlarge its diameter and interiorly at the juncture of the two diameters to form a shoulder adapted to serve as a seat for a spring or socket block.

This eliminates any joints which require inspection, lessens the cost of manufacture and produces a stronger link without any increase in weight of metal.

Various other features of my invention will be more fully revealed in the description of the accompanying drawings forming a part of this invention, and in such drawings like characters of reference denote corresponding parts throughout the several views, of which:

Figure 1 is a plan view of an end portion of a steering reach rod or drag link illustrating the ball end of a crank supported within the enlarged end of the link.

Fig. 2 is a partial vertical section of the part shown in Fig. 1, with the portions thereof shown in elevation.

Fig. 3 is a detailed sectional view of the link with both of the ends expanded to a larger diameter than the intermediate portion.

Fig. 4 is a modified form of rod in which the enlarged end of the tubing is compressed longitudinally or otherwise formed to provide it of equal or greater thickness than the wall thickness of the intermediate portion of the tube.

Various methods and means may be employed for enlarging the ends of the tubing, but as the process of manufacture is not directly concerned herein, the description will be confined to the device as an article of manufacture.

It comprises a length of tubing of a particular diameter necessary for a given size of link, in which the intermediate portion, 1, of the link represents the normal diameter of the tubing and of a smaller diameter than the ends, 2. Expanding the end of the tube provides an outwardly bent portion, 3, as the juncture of the smaller and larger diameters of the tube. This outwardly bent portion provides a shoulder which serves as a seat for either a spring or socket block. In the drawing it is shown as providing a seat for a socket block, 4, being one type of reach rod construction.

This socket block is engaged by the ball end, 5, of the crank arm, 6. A bearing block, 7, engages the opposite side of the ball, and fits within the enlarged end portion of the tube. This bearing block is provided axially with a boss extension, 8, projecting into the coil of a spring, 9, housed within the enlarged end of the link. The spring is retained or confined within such enlarged end and under compression by a screw plug, 10, screw threaded into the end of the tube.

This plug is slotted to receive a cotter pin, 11, which engages through the tubing as a lock for the screw plug.

The construction of the ball or universal joint for the crank is of a well known type, and represents one of the commercial forms with a single spring. In some instances a spring engages the rear socket block, 4, and under such arrangements the spring would seat against the shoulder, formed by expanding the walls of the tubing from the smaller to a larger diameter.

The enlarged end of the tube is notched or apertured to provide an opening, 12, through which the crank, 6, projects. The process of expanding the tubing is a very simple and quick one and can be accomplished without injury to the tubing. The shoulder serves to reinforce the tubing at such point, and provides a reach rod which has no welded or connected joints to be inspected from both the interior or the exterior of the tubing.

In expanding the tube from one diameter to that of a larger, the wall thickness is slightly decreased. This for some size of length is immaterial as the normal thickness of the tube is sufficient to withstand a slight reduction when enlarged without weakening the tube at the enlarged end, and is also of sufficient thickness for threading.

For some sizes of reach rods, a thin tubing will be of sufficient strength, but which when expanded would not provide a sufficient wall thickness for threading. In such instances, the wall thickness is increased by compressing the end of the tube longitudinally.

The normal thickness of the tube walls at its ends is therefore increased for a required tensile strength or greater than the intermediate portion, enabling the manufacture of a drag link of reduced weight.

Having described my invention, I claim:—

1. A steering rod connection consisting of an integral piece of tubing having a swaged end enlarging its diameter for providing a socket, and forming an annular shoulder portion as a juncture for the two different diameter portions of the tubing for providing a seat at the inner end of the socket, said enlarged end having its metal thickness increased to the normal metal thickness of the tubing.

2. A steering rod connection consisting of an integral piece of tubing having a swaged end enlarging its diameter for providing a socket, and forming an annular shoulder portion as a juncture for the two different diameter portions of the tubing for providing a seat at the inner end of the socket, said enlarged end having a thickness of metal equal to or greater than the normal metal thickness of the tubing.

In witness whereof, I hereunto subscribe my name, as attested by the two subscribing witnesses.

CLIFFORD GREENE.

Witnesses:
L. A. BECK,
M. SMITH.